United States Patent [19]
Pascucci

[11] Patent Number: 5,889,723
[45] Date of Patent: Mar. 30, 1999

[54] STANDBY VOLTAGE BOOSTING STAGE AND METHOD FOR A MEMORY DEVICE

[75] Inventor: Luigi Pascucci, Sesto San Giovanni, Italy

[73] Assignee: SGS-Thomson Microelectronics S.r.l., Agrate Brianza, Italy

[21] Appl. No.: 826,008

[22] Filed: Mar. 27, 1997

[30] Foreign Application Priority Data

Mar. 29, 1996 [EP] European Pat. Off. .............. 96830178

[51] Int. Cl.⁶ .................................................. G11C 13/00
[52] U.S. Cl. .......................................... 365/229; 365/226
[58] Field of Search ..................................... 365/229, 226

[56] References Cited

U.S. PATENT DOCUMENTS 4,288,865  9/1981  Grahm ..................................... 365/229
5,446,697  8/1995  Yoo et al. ............................... 365/226

FOREIGN PATENT DOCUMENTS

A-0 644 646  3/1995  European Pat. Off. ......... H02M 3/07
A-0 661 795  7/1995  European Pat. Off. ......... H02M 3/07

*Primary Examiner*—Terrell W. Fears
*Attorney, Agent, or Firm*—Wolf, Greenfield & Sacks, P.C.

[57] ABSTRACT

A voltage booster stage including a voltage booster circuit; a generating circuit generating an enabling signal enabling the voltage booster circuit; and a control circuit controlling the generating circuit. The control circuit receives a standby signal, and generate an operating mode signal having a first value indicating a voltage boost operating mode, and a second value indicating a supply voltage operating mode. The generating circuit receives the operating mode signal and the standby signal, and generates the enabling signal enabling the voltage booster circuit in the presence of the standby signal and the first value of the operating mode signal.

45 Claims, 3 Drawing Sheets

STANDBY VOLTAGE BOOSTING STAGE AND METHOD FOR A MEMORY DEVICE

BACKGROUND OF THE INVENTION

1. Field of the Invention

The present invention relates to a standby voltage boosting stage and method for a memory device.

2. Discussion of the Related Art

Voltage boosters are currently designed to operate in one of several paradigms. In a first paradigm, the booster only operates when the device is active (not on standby); in a second paradigm, the booster also operates in regulating mode when the device is on standby (i.e., a regulating device monitors the voltage on the output boost line of the pump, and enables or disables the pump accordingly); and in a third paradigm, the booster operates in free-running mode (with no regulation) but at low frequency also when the device is on standby.

None of the above paradigms is without drawbacks. The first paradigm has a slow response during reading after being on stand-by; the second paradigm, while solving the slow response problem, presents the drawback of high power consumption, which is unacceptable in most applications; and the third paradigm, while also solving the slow response problem, only partly solves the problem of high power consumption. Though acceptable at low supply voltages, in which case, a circuit ready to switch from standby is preferable to a circuit with no stand-by power consumption, the third solution is unacceptable with standard supply voltages (5 V), in which case, power consumption of the pump may be unnecessarily increased or unacceptably high.

Moreover, being specially designed and implemented for low-voltage devices (typically 3 V), all of the above paradigms are rigid and unadaptable to other voltage levels.

SUMMARY OF THE INVENTION

It is an object of the present invention to provide a voltage booster stage presenting a flexible structure operating continuously between low and high supply voltages, and which provides for power consumption levels correlated to the operation required.

According to the present invention there is provided a standby voltage boosting circuit for a memory device, comprising:
  a voltage booster circuit having a first input;
  a generating circuit, having a first input to receive a standby signal, a second input to receive an operating mode signal, and a first output coupled to the voltage booster circuit input, to generate a first control signal on the first output; and
  a control circuit, having an input to receive the standby signal, the control circuit including an operating mode detecting circuit having an output to provide the operating mode signal, the operating mode signal having a first value indicating a voltage boost operating mode, and a second value indicating a supply voltage operating mode.

According to another embodiment of the present invention, there is provided a standby voltage boosting method for a memory device, comprising the steps of:
  generating an operating mode signal to have a first value indicating a voltage boost operating mode, and a second value indicating a supply voltage operating mode;
  generating a standby signal to have one of a first value and a second value; and
  generating a control signal, for controlling a voltage booster circuit when the standby signal and the operating mode signal have predetermined values.

BRIEF DESCRIPTION OF THE DRAWINGS

A preferred, non-limiting embodiment of the present invention will be described by way of example with reference to the accompanying drawings, in which.

DETAILED DESCRIPTION

Figure 1:
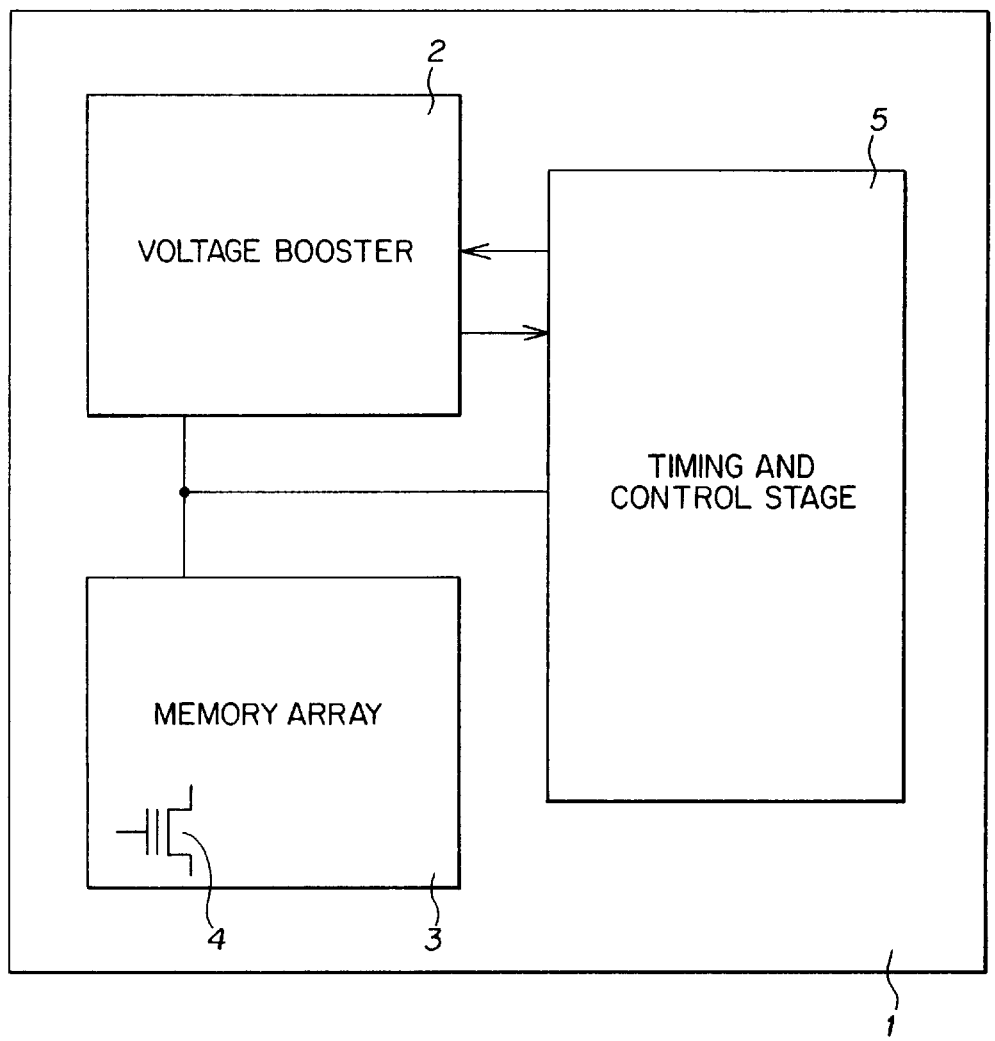
FIG. 1 shows a block diagram of one embodiment of a memory device comprising an embodiment of a stage according to the invention.

In FIG. 1, a memory device 1 comprises a nonvolatile memory, such as an EPROM, of which only the parts pertinent to the present invention are shown.

Memory device 1 comprises a voltage boosting stage 2; a memory array 3 including a number of memory cells 4; and a timing and control stage 5, which, among other things, generates the signals controlling operation of voltage boosting stage 2.

Figure 2:
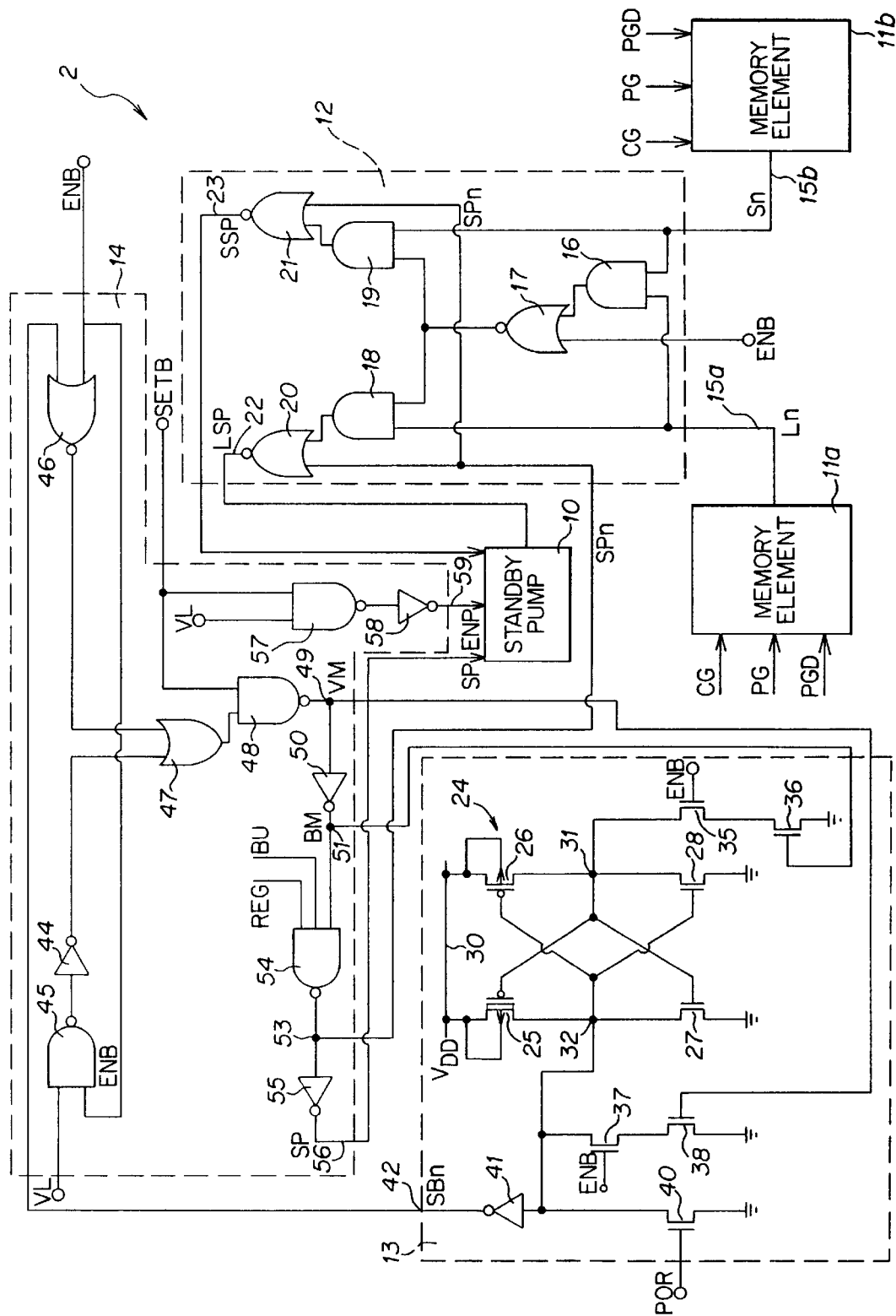
FIG. 2 shows a circuit diagram of one embodiment of a voltage boosting stage according to the invention.

With reference to FIG. 2, voltage boosting stage 2 comprises a charge pump 10 (shown in detail in FIG. 3); two nonvolatile memory elements 11a and 11b for storing the operating mode of pump 10; a configuration circuit 12 connected to memory elements 11a, 11b and pump 10, for configuring pump 10 as determined by the values stored in memory elements 11a, 11b; a standby set circuit 13 for setting the enabled/disabled condition of pump 10 in standby operating mode; and a control circuit 14 connected to configuration circuit 12, to set circuit 13, and to pump 10, for controlling operation of the pump.

Memory elements 11a, 11b (identical) preferably comprise a memory cell (preferably an UPROM cell) and a latch (neither shown), and are each supplied by timing and control stage 5 with a read biasing signal CG and signals PG and PGD for programming the memory cell. At their respective outputs 15a, 15b, memory elements 11a, 11b generate respective digital signals Ln, Sn, which together specify three different operating frequencies for the pump 10, or to disable the pump (as explained in detail below). Before memory elements 11a, 11b are programmed, signals Ln, Sn are both high, and switch to low when the respective memory element is programmed.

Configuration circuit 12 comprises an AND gate 16 presenting two inputs connected to and supplied by respective memory elements 11a, 11b with respective signals Ln, Sn, and an output connected to an input of a NOR gate 17, which is also supplied by stage 5 with a signal ENB (the state of which indicates active or standby operating mode of the device). The output of NOR gate 17 is connected to one input of an AND gate 18 and to one input of an AND gate 19; another input of AND gate 18 is connected to memory element 11a; and another input of AND gate 19 is connected to memory element 11b. The output of AND gate 18 is connected to one input of a NOR gate 20; the output of AND gate 19 is connected to one input of a NOR gate 21; both NOR gates 20, 21 are supplied with a signal SPn generated by control circuit 14; and the outputs of NOR gates 20, 21 (nodes 22, 23) supply respective signals LSP, SSP to pump 10.

Standby set circuit 13 comprises a flip-flop 24 formed by a first and second PMOS transistor 25, 26, and by two NMOS transistors 27, 28. More specifically, PMOS transistors 25, 26 have the source terminals connected to supply line 30 at $V_{DD}$, the gate terminals connected respectively to a first node 31 and a second node 32, and the drain terminals connected respectively to second node 32 and first node 31. Transistor 25 is a native type and therefore presents a high threshold. NMOS transistors 27, 28 have the source terminals grounded, the gate terminals connected respectively to first node 31 and second node 32, and the drain terminals connected respectively to second node 32 and first node 31.

First node 31 is grounded via two NMOS transistors 35, 36 in series with each other, the gate terminals of which are supplied respectively with signal ENB by stage 5, and with a signal BM generated by control circuit 14; second node 32 is grounded via two NMOS transistors 37, 38 in series with each other, the gate terminals of which are supplied respectively with signal ENB by stage 5, and with a signal VM generated by control circuit 14; second node 32 is also grounded via an NMOS transistor 40, the control terminal of which is supplied with a POR (power-on reset) signal by stage 5; and second node 32 is also connected to the input of an inverter 41, the output (node 42) of which presents a signal SBn.

Control circuit 14 comprises a NAND gate 45, the inputs of which are supplied respectively with a signal VL (indicating low supply voltage) and signal ENB from stage 5; an inverter 44 connected to the output of NAND gate 45; and a NOR gate 46, one input of which is connected to node 42 (by which it is supplied with signal SBn), and the other input of which is supplied with signal ENB. The outputs of inverter 44 and NOR gate 46 are connected to respective inputs of an OR gate 47, the output of which is connected to one input of a NAND gate 48, the other input of which is supplied with a boost set signal SETB by stage 5. The output of NAND gate 48 defines a node 49 presenting signal VM supplied to transistor 38, and is connected to an inverter 50, the output of which defines a node 51 supplying signal BM to transistor 36. Node 51 is also connected to one input of a three-input NAND gate 54, which is also supplied by stage 5 with signals REG and BU for regulating and disabling pump 10 in predetermined operating conditions (e.g., during programming). The output of NAND gate 54 supplies signal SPn to configuration circuit 12, and is connected to an inverter 55, the output of which (node 56) supplies a signal SP to pump 10. Control circuit 14 also comprises a NAND gate 57, the inputs of which are supplied with signals SETB and VL, and the output of which is connected to an inverter 58, the output of which forms a node 59 supplying a signal ENP supplied to pump 10.

Figure 3:
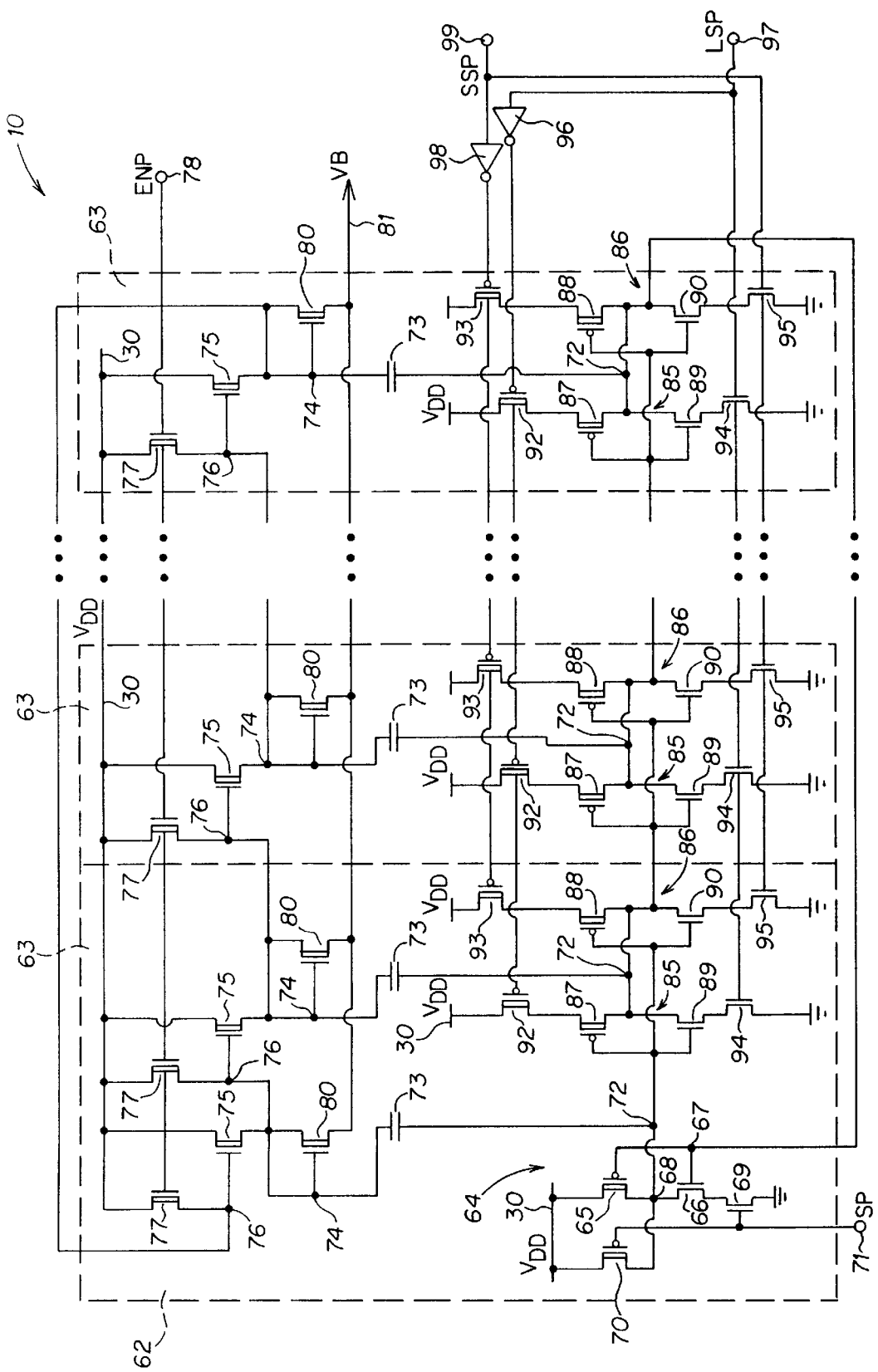
FIG. 3 shows a circuit diagram of one embodiment of a block of the FIG. 2 stage.

Pump 10 (shown in detail in FIG. 3) presents a modular structure comprising a first stage 62 followed by a number of parallel stages 63 (only some of which are shown in FIG. 3).

First stage 62 comprises an input inverter 64 formed by a PMOS transistor 65 and by an NMOS transistor 66. PMOS transistor 65 (native type) has the source terminal connected to supply line 30, the gate terminal connected to the gate terminal of NMOS transistor 66 (node 67), and the drain terminal connected to the drain terminal of transistor 66 (node 68); transistor 66 has the source terminal grounded via an NMOS transistor 69, the gate terminal of which is connected to an input node 71 receiving signal SP supplied at the output 56 of control circuit 14; and node 68 is connected to supply line 30 via a PMOS transistor 70 (native type), the gate terminal of which is also connected to input node 71.

Node 68 is connected to one terminal 72 of a boost capacitor 73, the other terminal 74 of which is connected to supply line 30 via a native NMOS transistor 75, the gate terminal of which defines a node 76 and is in turn connected to supply line 30 via an NMOS enabling transistor 77. The gate terminal of enabling transistor 77 is connected to an input node 78 receiving enabling signal ENP from output 59 of control circuit 14; and node 74 is connected to the drain and gate terminals of a native NMOS output transistor 80 forming a diode and having the source terminal connected to a boost line 81 (presenting boost voltage $V_B$).

Stages 63 present the same structure as first stage 62 with respect to boost capacitor 73 and the upper portion (transistors 75, 77, 80), and only differ from stage 62 with respect to the lower portion. More specifically, in each stage, node 76 is connected to node 74 of the previous stage, enabling transistors 77 are all connected to input 78, and output transistors 80 are all connected to boost line 81; node 74 of the last stage 63 is connected to node 76 of first stage 62; and stages 63 all present at the bottom two parallel inverters 85, 86 formed by respective native PMOS transistors 87, 88, and by respective NMOS transistors 89, 90, and supplied by respective native PMOS transistors 92, 93, and by respective NMOS transistors 94, 95.

More specifically, transistors 87–90 have the gate terminals connected to one another and to node 72 of the previous stage, and the drain terminals connected to one another and to node 72 of the same stage (i.e., to the lower terminal of their own capacitor 73); node 72 of the last stage 63 is connected to node 67 of first stage 62; each transistor 87 has the source terminal connected to the drain terminal of respective transistor 92; transistors 92 all have the source terminal connected to supply line 30, and the gate terminal connected to the output of an inverter 96, the input of which is connected to an input node 97 of pump 10, receiving signal LSP supplied at output 22 of configuration circuit 12; each transistor 88 has the source terminal connected to the drain terminal of respective transistor 93; transistors 93 all have the source terminal connected to supply line 30, and the gate terminal connected to the output of an inverter 98, the input of which is connected to an input node 99 of pump 10, receiving signal SSP supplied at output 23 of configuration circuit 12;

each transistor 89 has the source terminal connected to the drain terminal of respective transistor 94;

transistors 94 all have the source terminal grounded, and the gate terminal connected to input node 97; each transistor 90 has the source terminal connected to the drain terminal of respective transistor 95; and transistors 95 all have the source terminal grounded, and the gate terminal connected to input node 99.

Descriptions of circuit operation will now be given first for pump 10 in FIG. 3, and second for the circuit in FIG. 2.

Pump 10, is an improvement on the basic structure shown in FIG. 1 of Patent Application EP-A-O 666 571 and, in part operates in a similar manner to that described in detail therein. 5 Operation is based on the principle of charging capacitors 73 to supply voltage $V_{DD}$ via transistors 75 when respective nodes 72 are low, and transferring the stored charge to boost line 81 via diode transistors 80 when respective nodes 72 are high and nodes 74 are at $2V_{DD}$. Transistors 77 of pump 10 are only enabled in the presence of a high ENP signal, and enable operation of pump 10. Conversely, in the presence of a low ENP signal, transistors 77 and 75 are turned off and no power is supplied to the pump.

When signal SP is low, transistor 69 is turned off and disables inverter 64; and transistor 70 is turned on, thus locking node 72 of first stage 62 at $V_{DD}$, and preventing regular switching of nodes 72 of stages 63 and, hence, charging and discharging of capacitors 73.

Signals LSP and SSP determine the operating conditions of pump 10. That is, when both are low, signals LSP and SSP keep transistors 94, 95 and (via inverters 96, 98) transistors 92, 93 off, so that inverters 85 and 86 are off to prevent regular switching of nodes 72. When signal LSP is high and SSP low, transistors 92, 94 are on to enable inverters 85; transistors 93, 95 are off to keep inverters 86 off; and the switching speed of nodes 72 is therefore determined solely by the switching of inverters 85, with inverters 86 forming a capacitive (and hence slightly braking) load, so that pump 10 operates at a lower first frequency. When signal SSP is high and LSP low, transistors 93, 95 and inverters 86 are on, and transistors 92, 94 and inverters 85 are off; and, since inverters 86 are faster to switch than inverters 85, but inverters 85 form a capacitive load, pump 10 operates at a second frequency higher than the first. Finally, when both signals LSP and SSP are high, transistors 92–95 and inverters 85, 86 are all on; the work frequency is now determined substantially by inverters 86, with switching being assisted by inverters 85 which no longer form a passive load; and pump 10 therefore operates at a maximum third frequency.

Signals SETB, BU and REG in FIG. 2 determine the functioning of pump 10. That is, when SETB is low (to prevent operation of the pump during power-on reset and/or when memory elements 11a, 11b are not programmed), the output of NAND gate 57 is high, and signal ENP at output 59 of control circuit 14 is low to turn off pump 10 as described above. Moreover, the output of NAND gate 48 is high; BM is low; the output of NAND gate 54 is high; signal SP is low to lock node 68 (FIG. 3) to the supply voltage; and signal SPn is high, so that signals LSP and SSP are low and inverters 85, 86 (FIG. 3) are off as described above. Conversely, when high, SETB has no effect on the operation of booster stage 2. Similarly, when low, signal BU (for disabling pump 10 when programming memory device 1) and signal REG (for determining the on-off sequence of pump 10 and regulating it during active operation of device 1) keep signals SP, LSP and SSP low so that pump 10 is turned off.

When device 1 is turned on during power-on reset, the POR signal is high and transistor 40 is on to keep node 32 of flip-flop 24 low; output 42 of standby set circuit 13 (signal SBn) is therefore set to high (corresponding to standby disabling of pump 10); and signal SETB is definitely low, so that pump 10 is off as described above.

During active operation of device 1, signal ENB is high and, assuming signals SETB, REG and BU are high, the output of NOR gate 46 is low; and NAND gate 45 is enabled with its output depending on VL. If VL is high (low supply voltage condition detected by a detecting circuit in stage 5), the output of gate 57 is low and signal ENP is high to enable pump 10; the outputs of inverter 44 and OR gate 47 are high; the output of NAND gate 48 is low, so that signal VM (voltage mode) is low and signal BM (boost mode) is high; transistor 36 is therefore on and transistor 38 off, so that flip-flop 24 switches to switch signal SBn to low and stores the enabled condition of pump 10.

Since BM is high, signal SPn is low and signal SP high. The high SP signal turns off the structure freezing switching of the inverters (transistors 69, 70 in FIG. 3) as described above, while the low SPn signal operates the structure at full rate. That is, the high ENB signal at the input of NOR gate 17 generates a low output of gate 17, so that the outputs of both AND gates 18, 19 are low, and NOR gates 20, 21, receiving two low input signals, switch signals LSP and SSP to high, which, as stated, corresponds to the maximum operating frequency of pump 10.

Conversely, if VL is low (high supply voltage), the output of inverter 44 is low; and, since the output of NOR gate 46 is also low during active operation, the output of the OR gate is low, signal VM is high, and signal BM is low. Flip-flop 24 therefore maintains its previously set condition wherein node 31 is high, node 32 low, and signal SBn is high. Moreover, signal SP is low, signal SPn is high, and both signals LSP and SSP are low, so that pump 10 is turned off. The above condition is established as soon as signal VL switches from high to low (e.g., during the rising transient state of supply voltage $V_{DD}$, when device 1 is turned on with a high supply voltage).

When device 1 switches to standby, signal ENB switches to low, so that flip-flop 24 is frozen in the state previously memorized by transistors 35 and 37 being turned off and cutting off the connection between standby set circuit 13 and control circuit 14. The switching of signal ENB disables NAND gate 45, the output of which switches to high regardless of VL; and any switching of VL after device 1 switches to standby therefore has no effect on circuit 14. If, prior to ENB switching, SBn was high (high supply voltage, pump 10 turned off), the output of gate 46 remains low; and, since the output of NAND gate 45 is high, the output of inverter 44 is low, the output of OR gate 47 is low, and the output of NAND gate 48 is high, so that VM is high and BM low. Since, in standby mode, signals REG and BU are always definitely high, SPn is high and SP low, so that pump 10 is turned off as described above. The same also applies in the event memory elements 11a, 11b are not programmed (Ln and Sn both high), in which case, SETB is low.

Conversely, if, prior to ENB switching, signal SBn was low (boost condition), the outputs of gate 46 and OR gate 47 switch to high, so that VM remains low and BM high, SPn is low and SP high, and, since SPn is low, the value of signals LSP and SSP and the operating speed of pump 10 depend on the settings of memory elements 11a, 11b. That is, in this condition, the output of NOR gate 17 is no longer governed by ENB (now low). More specifically, since one or both of signals Ln, Sn must be low, the output of AND gate 16 is low, and the output of NOR gate 17 is high and enables gates 18, 19. If only signal Sn is high, the output of gate 18 is low and the output of gate 19 is high, so that SSP is low, LSP is high, and pump 10 operates at a lower frequency. Conversely, if only signal Ln is high, the output of gate 18 is high and the output of gate 19 is low, so that SSP is high, LSP is low, and pump 10 operates at average frequency. If both signals Ln and Sn are low, the outputs of gates 18, 19 are both low, signals LSP and SSP are both high, and pump 10 operates at maximum frequency.

Advantages of the circuit described above include the following. By monitoring the operating condition of the pump prior to switching to standby, this embodiment appropriately controls operation of the pump in standby mode, and more specifically provides for automatically 25 enabling and disabling the pump according to the voltage supply used in the device during active operation. Standby operation of the pump may be performed at different frequencies, depending on the settings of nonvolatile (but programmable) memory elements 11a, 11b, e.g., to take into account the operating temperature of the device, which determines losses at various levels; active operation of the pump may be selectively free-running or regulated.

The structure of the pump is extremely compact, due to the various frequencies being obtained using the same diode and capacitance structure (upper part of stages 63) and only duplicating the inverters in the drive loop (lower part of stages 63). Moreover, power consumption of the pump is low when operating with a low supply voltage, and zero with a high supply voltage.

Clearly, changes may be made to the circuit as described and illustrated herein without, however, departing from the scope of the present invention. In particular, the combinatorial circuits may be formed otherwise than as described and illustrated herein.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A standby voltage boosting circuit, for a memory device having a supply voltage, comprising:

a voltage booster circuit to receive the supply voltage and to provide a boosted voltage higher than the supply voltage for use in active operation of the device, the voltage booster circuit having a first input;

a generating circuit, having a first input to receive a standby signal, a second input to receive an operating mode signal, and a first output coupled to the voltage booster circuit input, to generate a first control signal on the first output; and a control circuit, having an input to receive the standby signal, the control circuit including an operating mode detecting circuit having an output to provide the operating mode signal, the operating mode signal having a first value indicating a voltage boost operating mode, and a second value indicating a supply voltage operating mode.

2. The circuit of claim 1, further comprising a first memory circuit, coupled to the generating circuit, to store a first work frequency signal of the voltage booster circuit.

3. The circuit of claim 2, wherein the voltage booster circuit includes at least one booster stage, the booster stage comprising:

a first reference potential line;

an output line;

a capacitive element having a first terminal and a second terminal;

a first switching circuit coupled to the first terminal of the capacitive element and to the first reference potential line;

a second switching circuit coupled to the first terminal of the capacitive element and to the output line; and a drive circuit, connected to the second terminal of the capacitive element, to switch the second terminal between a first voltage value and a second voltage value, the drive circuit including a first logic circuit and a second logic circuit, the first logic circuit being coupled in parallel with the second logic circuit, the first logic circuit presenting to a first switching speed for the voltage at the second terminal of the capacitive element, the second logic circuit presenting a second switching speed for the voltage at the second terminal of the capacitive element, the first and the second switching speeds having different values.

4. The circuit of claim 3, wherein:

the first logic circuit comprises a first controlled switch having a control input and a second controlled switch having a control input;

the second logic circuit comprises a third controlled switch having a control input and a fourth controlled switch having a control input;

the first output of the generating circuit is coupled to the control input of the first controlled switch and to the control input of the second controlled switch; and the generating circuit further comprises a second output to provide a second control signal, the second output being coupled to the control input of the third controlled switch and to the control input of the fourth controlled switch.

5. The circuit of claim 4, wherein:

the first logic circuit further comprises an inverting element coupled to the first reference potential line through the first controlled switch and to a second reference potential line through the second controlled switch; and the second logic circuit further comprises an inverting element coupled to the first reference potential line through the third controlled switch and to the second reference potential line through the fourth controlled switch.

6. The circuit of claim 4, wherein:

the first memory circuit comprises
      a first nonvolatile element to store a value of the first work frequency signal, and
      a second nonvolatile element to store a value of a second work frequency signal; and the generating circuit further comprises a third logic circuit to the first nonvolatile element and the second nonvolatile element and to the first and second outputs of the generating circuit, the third logic circuit to generate the first control signal in response to values of the standby signal and the first work frequency signal, and to generate the second control signal in response to values of the standby signal and the second work frequency signal.

7. The circuit of claim 6, wherein the third logic circuit comprises an enabling circuit having an input to receive the standby signal, to generate the first control signal and the second control signal based on stored values of the first nonvolatile memory element and the second nonvolatile memory element when the standby signal indicates that the voltage booster circuit is to operate in a standby mode.

8. The circuit of claim 2, further comprising a second memory circuit coupled to the operating mode detecting circuit to store a value of the operating mode signal.

9. The circuit of claim 8, wherein:

the second memory circuit has an output to supply a mode storage signal;

the operating mode detecting circuit has a first input to receive a voltage level signal, a second input to receive the standby signal, and a third input coupled to the output of the second memory circuit to receive the mode storage signal; and the operating mode detecting circuit comprises
      a first logic circuit coupled to the first input, the second input and the output of the operating mode detecting circuit, to provide the first value of the operating mode signal for a predetermined value of the voltage level signal and when the standby signal indicates that the memory device is operating in a standby mode of operation, and a second logic circuit coupled to the second input, the third input and the output of the operating mode detecting circuit, to provide the first value of the operating mode signal for a predetermined value of the mode storage signal and when the standby signal indicates that the memory device is operating in a normal mode of operation.

10. The circuit of claim 9, wherein the operating mode detecting circuit further comprises:

a fourth input to receive an operation disabling signal; and a third logic circuit coupled to the fourth input and to the output of the operating mode detecting circuit to generate the second value of the operating mode signal when the operation disable signal has a predetermined value.

11. The circuit of claim 8, further comprising:

a first controlled switch operable in response to the standby signal;

a second controlled switch, operable in response to the output of the operating mode detection circuit;

a third controlled switch operable in response to the standby signal;

a fourth controlled switch, operable in response to the output of the operating mode detection circuit and having an opposite phase of operation from operation of the second controlled switch; and wherein the second memory circuit comprises a flip-flop circuit having a first input coupled to the first controlled switch and to the second controlled switch and a second input coupled to the third controlled switch and the fourth controlled switch.

12. A standby voltage boosting method, for a memory device having a supply voltage, comprising steps of:

generating an operating mode signal to have a first value indicating a voltage boost operating mode, and a second value indicating a supply voltage operating mode;

generating a standby signal to have one of a first value and a second value; and generating a control signal, for controlling a voltage booster circuit when the standby signal and the operating mode signal have predetermined values the voltage booster circuit to supply a boosted voltage higher than the supply voltage. the boosted voltage for use in actively operating the memory device.

13. The method of claim 12, further comprising steps of:

providing the voltage booster circuit, the voltage booster circuit comprising at least one booster stage, and a switching circuit having a first logic circuit to operate the voltage booster circuit at a first switching speed, and a second logic circuit, coupled in parallel with the first logic circuit, to operate the voltage booster circuit at a second switching speed;

storing a first work frequency signal; and enabling operation of at least one of the first logic circuit and the second logic circuit on the basis of the first work frequency signal.

14. A method as claimed in claim 12, further comprising steps of:

providing the voltage booster circuit, the voltage booster circuit comprising at least one booster stage, and a switching circuit having a first logic circuit to operate the voltage booster circuit at a first switching speed, and a second logic circuit, coupled in parallel with the first logic circuit, to operate the voltage booster circuit at a second switching speed;

storing a first work frequency signal;

storing a second work frequency signal;

enabling operation of the first logic circuit in response to values of the standby signal and the first work frequency signal; and enabling operation of the second logic circuit in response to values of the standby signal and the second work frequency signal.

15. The method of claim 14, further comprising a step of:

enabling operation of the first logic circuit and the second logic circuit when the operating mode signal has the first value and in response to the standby signal.

16. The method of claim 12, further comprising a step of storing the operating mode signal.

17. A method as claimed in claim 16, further comprising steps of:

generating a stored mode signal;

providing a voltage level signal;

generating the first level of the operating mode signal based on the voltage level signal when the standby signal has a first value; and generating the first level of the operating mode signal based on the stored mode signal when the standby signal has a second value.

18. The method of claim 17, further comprising steps of:

providing an operation disabling signal; and generating the second level of the operating mode signal in response to the operation disabling signal.

19. A method of operating a voltage boosting circuit for a device, the voltage boosting circuit being operable in a boosting mode and a standby mode, comprising steps of:

detecting when the device is operating in a device boost mode, the device potentially requiring voltage boosting during operation of the device in the device boost mode;

disabling operation of the voltage boosting circuit when the device is not operating in the device boost mode; and enabling operation of the voltage boosting circuit when the device is not operating in the device boost mode.

20. The method of claim 19, wherein the device comprises a memory circuit and the detecting step comprises a step of:

sensing when a supply voltage of the device is low.

21. The method of claim 19, wherein the detecting step comprises a step of:

sensing when the voltage boosting circuit is operating in the boosting mode; and storing a value corresponding to operation of the voltage boosting circuit in the boosting mode.

22. The method of claim 19, further comprising steps of:

operating the voltage boosting circuit at a first frequency during standby mode when the device is operating in the device boost mode; and operating the voltage boosting circuit at a second frequency during boosting mode when the device is operating in the device boost mode.

23. The method of claim 22, further comprising a step of:

determining the first frequency based on a first stored value.

24. The method of claim 22, further comprising a step of:
determining the first frequency based on a plurality of stored values.

25. A voltage boosting circuit for a device, comprising:
a voltage pump circuit;
means for detecting when the device is operating in a device boost mode, the device potentially requiring voltage boosting during operation of the device in the device boost mode;
means for disabling operation of the voltage pump circuit when the device is not operating in the device boost mode; and
means for enabling operation of the voltage pump circuit when the device is not operating in the device boost mode.

26. The circuit of claim 25, wherein the means for detecting comprises:
means for sensing when the voltage boosting circuit is operating in the boosting mode; and
a storage element, coupled to the means for sensing, to store a value corresponding to operation of the voltage boosting circuit in boosting mode.

27. The circuit of claim 25, further comprising:
means for operating the voltage pump circuit at a first frequency, during standby mode when the device is operating in the device boost mode; and
means for operating the voltage pump circuit at a second frequency during boosting mode when the device is operating in the device boost mode.

28. The circuit of claim 27, further comprising:
means for determining the first frequency based on a first stored value.

29. The circuit of claim 28, wherein the voltage pump circuit comprises
a plurality of voltage boosting stage circuits, each comprising
a voltage boosting element,
a first drive circuit, coupled to the voltage boosting element, to drive the voltage boosting element at a first frequency, and
a second drive circuit, coupled to the voltage boosting element, to drive the voltage boosting element at a second frequency; and
the means for determining the first frequency comprises a logic circuit coupled to the storage element and the first drive circuit.

30. A method of operating a voltage boosting circuit operable in a boosting mode and a standby mode, the method comprising steps of:
storing a first frequency value;
operating the voltage boosting circuit at a standby frequency during the standby mode, the standby frequency being responsive to the first frequency value; and
operating the voltage boosting circuit at a boosting frequency during the boosting mode of operation.

31. The method of claim 30, wherein the boosting frequency is a maximum frequency of operation for the boosting circuit.

32. The method of claim 30, further comprising a step of storing a second frequency value, and wherein the standby frequency is responsive to the first frequency value and the second frequency value.

33. The method of claim 32, wherein the voltage boosting circuit comprises:
a plurality of voltage boosting stage circuits, each comprising
a voltage boosting element,
a first drive circuit, coupled to the voltage boosting element, to drive the voltage boosting element at a first frequency, and
a second drive circuit, coupled to the voltage boosting element, to drive the voltage boosting element at a second frequency; and
the step of operating the voltage boosting circuit at the standby frequency comprises a step of selectively enabling one of: the first drive circuit, the second drive circuit, both the first drive circuit and the second drive circuit and neither the first drive circuit nor the second drive circuit.

34. The method of claim 33, further comprising a step of:
selectively disabling the voltage boosting circuit when the operating parameters of a device coupled to the voltage boosting circuit indicate that voltage boosting will not be required.

35. A voltage boosting circuit for a device, the voltage boosting circuit being operable in a boosting mode and a standby mode, comprising:
a voltage pump circuit;
a storage element to store a first frequency value;
means for operating the voltage pump circuit at a standby frequency, coupled to the storage element, the standby frequency being responsive to the first frequency value during the standby mode; and
means for operating the voltage pump circuit at a boosting frequency during the boosting mode of operation.

36. The circuit of claim 35, further comprising a storage element to store a second frequency value, coupled to the means for operating the voltage pump circuit at a standby frequency; and
wherein the standby frequency is responsive to the first frequency value and the second frequency value.

37. The circuit of claim 36, wherein the voltage pump circuit comprises:
a plurality of voltage boosting stage circuits, each comprising
a voltage boosting element,
a first drive circuit, coupled to the voltage boosting element, to drive the voltage boosting element at a first frequency, and
a second drive circuit, coupled to the voltage boosting element, to drive the voltage boosting element at a second frequency; and
the means for operating the voltage pump circuit at the standby frequency comprises a means for selectively enabling one of: the first drive circuit, the second drive circuit, both the first drive circuit and the second drive circuit and neither the first drive circuit nor the second drive circuit.

38. The circuit of claim 37, further comprising:
means for selectively disabling the voltage pump circuit when the operating parameters of the device indicate that voltage boosting will not be required.

39. A standby pump circuit, comprising:
a plurality of voltage boosting stage circuits, each comprising
a voltage boosting element,
a first drive circuit, coupled to the voltage boosting element, to drive the voltage boosting element at a first frequency, and a second drive circuit, coupled to the voltage boosting element, to drive the voltage boosting element at a second frequency; and a selection circuit to selectively enable operation of the first drive circuit and the second drive circuit.

40. The standby pump circuit of claim 39, wherein the first drive circuit is coupled to the second driving circuit in parallel.

41. The standby pump circuit of claim 39, wherein the first frequency and the second frequency are different.

42. The standby pump circuit of claim 39, wherein the selection circuit includes a circuit to enable the first drive circuit and the second drive circuit at the same time, to drive the voltage boosting element at a third frequency.

43. The standby pump circuit of claim 42, wherein the first frequency, second frequency and third frequency each have different values.

44. A standby voltage boosting circuit for a non-volatile memory device having a supply voltage, comprising:

a voltage booster circuit to receive the supply voltage and to provide a boosted voltage higher than the supply voltage for use in active operation of the device, the voltage booster circuit having a first input;

a generating circuit, having a first input to receive a standby signal, a second input to receive an operating mode signal, and a first output coupled to the voltage booster circuit input, to generate a first control signal on the first output; and a control circuit, having an input to receive the standby signal, the control circuit including an operating mode detecting circuit having an output to provide the operating mode signal, the operating mode signal having a first value indicating a voltage boost operating mode, and a second value indicating a supply voltage operating mode.

45. A standby voltage boosting method for a non-volatile memory device having a supply voltage, comprising steps of:

generating an operating mode signal to have a first value indicating a voltage boost operating mode, and a second value indicating a supply voltage operating mode;

generating a standby signal to have one of a first value and a second value; and generating a control signal, for controlling a voltage booster circuit when the standby signal and the operating mode signal have predetermined values the voltage booster circuit to supply a boosted voltage higher than the supply voltage, the boosted voltage for use in actively operating the memory device.

* * * * *

UNITED STATES PATENT AND TRADEMARK OFFICE
CERTIFICATE OF CORRECTION

PATENT NO. : 5,889,723 Page 1 of 1
APPLICATION NO. : 08/826008
DATED : March 30, 1999
INVENTOR(S) : Luigi Pascucci It is certified that error appears in the above-identified patent and that said Letters Patent is hereby corrected as shown below:

Col. 9 Line 47 should read
--than the supply voltage, the boosted voltage for use in--

Signed and Sealed this

Seventeenth Day of April, 2007

JON W. DUDAS
*Director of the United States Patent and Trademark Office*